United States Patent
Natanzon (10) Patent No.: US 12,333,143 B2
(45) Date of Patent: Jun. 17, 2025

(54) METHODS AND SYSTEM OF PREVENTING DUPLICATION OF ENCRYPTED DATA

(71) Applicant: HUAWEI TECHNOLOGIES CO., LTD., Shenzhen (CN)

(72) Inventor: Assaf Natanzon, Hod Hasharon (IL)

(73) Assignee: Huawei Technologies Co., Ltd., Shenzhen (CN)

(*) Notice: Subject to any disclaimer, the term of this patent is extended or adjusted under 35 U.S.C. 154(b) by 309 days.

(21) Appl. No.: 18/171,203

(22) Filed: Feb. 17, 2023

(65) Prior Publication Data

US 2023/0259280 A1    Aug. 17, 2023

Related U.S. Application Data

(63) Continuation of application No. PCT/EP2020/073295, filed on Aug. 20, 2020.

(51) Int. Cl.
  G06F 16/14    (2019.01)
  G06F 3/06    (2006.01)

(52) U.S. Cl.
  CPC .......... G06F 3/0608 (2013.01); G06F 3/0619 (2013.01); G06F 3/0641 (2013.01); G06F 3/067 (2013.01); G06F 16/152 (2019.01)

(58) Field of Classification Search
  CPC .... G06F 3/0608; G06F 16/152; G06F 3/0619; G06F 3/0641; G06F 3/067
  See application file for complete search history.

(56) References Cited

U.S. PATENT DOCUMENTS

| | | | | |
|---|---|---|---|---|
| 11,698,986 B1 * | 7/2023 | Knas | .................... | H04L 9/0861 726/27 |
| 11,941,583 B1 * | 3/2024 | Knas | .................... | H04L 9/0643 |
| 2020/0412525 A1 * | 12/2020 | Katsak | .................... | H04L 9/50 |
| 2022/0019901 A1 * | 1/2022 | Saleh | .................... | H04L 9/50 |
| 2022/0027319 A1 * | 1/2022 | Narayanam | ......... | G06F 16/1748 |
| 2022/0027803 A1 * | 1/2022 | Irazabal | ............ | G06Q 10/0832 |
| 2022/0173893 A1 * | 6/2022 | Basu | .................... | H04L 9/3247 |
| 2023/0046965 A1 * | 2/2023 | Jayachandran | ....... | H04L 9/3239 |
| 2023/0413050 A1 * | 12/2023 | Avetisov | ................ | G06F 21/64 |
| 2024/0037503 A1 * | 2/2024 | Padmanabhan | .... | G06Q 30/0185 |
| 2024/0338682 A1 * | 10/2024 | Anton | .................... | H04L 9/50 |

OTHER PUBLICATIONS

Banerjee et al., "Blockchain Enabled Data Marketplace—Design and Challenges," arXiv:1811.11462v4, Total 7 pages (Sep. 27, 2019).

* cited by examiner

*Primary Examiner* — Stephen T Gundry (74) *Attorney, Agent, or Firm* — Leydig, Voit & Mayer, Ltd.

(57) ABSTRACT

Method prevents duplicate data to be stored in storage having hosts which do not trust each other. The method includes storage including encrypted data blocks, network further including distributed ledger, accessible to each of two or more hosts. The method includes steps, performed by first host when the first host wishes to store a new data block, obtaining first hash value for new data block, determining if first hash value is found in ledger. If first hash value is not found in ledger, creating set of confirmation data, encrypting new data block with block-unique encryption key, and storing first ownership record in ledger. If first hash value is found in ledger, obtaining information about second host that has already stored previous block identical to new data block, entering in ledger key request, receiving from ledger key transfer record, sending to ledger new ownership record.

15 Claims, 7 Drawing Sheets

METHODS AND SYSTEM OF PREVENTING DUPLICATION OF ENCRYPTED DATA

CROSS-REFERENCE TO RELATED APPLICATIONS

This application is a continuation of International Application No. PCT/EP2020/073295, filed on Aug. 20, 2020, the disclosure of which is hereby incorporated by reference in its entirety.

TECHNICAL FIELD

The present disclosure relates generally to the field of data protection and storage; and more specifically, to methods and computer systems of preventing duplication of encrypted data in a network. Moreover, the present disclosure also relates to computer program products to execute the methods. Further, the present disclosure also relates to hosts or computing devices associated with the network.

BACKGROUND

Data backup is used to protect and recover data in an event of data loss in a primary storage system. Examples of the event of data loss may include, but is not limited to, data corruption, hardware or software failure in the primary storage system, accidental deletion of data, hacking, or malicious attack. Thus, for safety reasons, a separate backup system or a storage system is used to store a backup of the data present in the primary storage system. Currently, conventional backup systems usually either read data changes or acquire data directly from the storage systems where data is stored. Some conventional backup systems store the entire changed data. As a result, with time, storage space of the backup systems becomes occupied as the changed data occupy a large storage space in the conventional backup systems. This is undesirable as it causes reduction in performance of the backup systems. Moreover, the cost of data storage, with all the associated costs including cost of storage hardware, continues to be a burden.

Currently, there are many techniques that may be employed for data reduction, for example data deduplication. However, such conventional techniques are inefficient and usually involve reducing the amount of data to be stored by eliminating duplicate data. For example, the data deduplication technique stores the data in the form of chunks and upon receiving new data, the new data is also divided into chunks of variable or fixed size. Thereafter, new data associated with the chunks of the new data is checked (via comparison), i.e. if identical data is already written into the storage system or not. If, the new data is already written only a pointer (or a reference) to the data is used. In this way, the data deduplication techniques overcome duplicating same data in the storage system. However, if the new data is stored using encryption, the data deduplication is possible only if there is mutual trust between a primary storage system and a backup system. As a result, if there is no mutual trust between systems (computing devices) associated with a cryptographic data storage system or network, deduplication techniques may not enable data reduction as encrypted data will be treated as new data (or changed data), resulting in inefficient data storage.

Therefore, in light of the foregoing discussion, there exists a need to overcome the aforementioned drawbacks associated with conventional cryptographic data storage system.

SUMMARY

The present disclosure seeks to provide methods, system, first and second host of the system, of preventing duplication of encrypted data in a storage arranged in a network in which two or more hosts can store data in the network. The present disclosure seeks to provide a solution to the existing problem of inefficient deduplication of data between computing devices (i.e. hosts) which do not trust each other. An aim of the present disclosure is to provide a solution that overcomes at least partially the problems encountered in prior art, and provide improved methods for preventing duplicate data to be stored in a cryptographic data storage system having two or more computing devices (i.e. hosts) which do not trust each other.

The embodiments of the present disclosure are provided in the enclosed independent claims. Additional embodiments of the present disclosure are further defined in the dependent claims.

In one aspect, the present disclosure provides a method of preventing duplication of encrypted data in a storage arranged in a network in which two or more hosts can store data in the network, the storage comprising one or more encrypted data blocks, the network further comprising a distributed ledger, accessible to each of the two or more hosts and holding, for each of the one or more encrypted data blocks, a first hash value identifying the data block, the method comprising the following steps, performed by a first host of the two or more hosts when the first host wishes to store a new data block in the storage, obtaining a first hash value for the new data block, determining if the first hash value is found in the ledger, if the first hash value is not found in the ledger, creating a set of confirmation data that constitute proof that the first host has ownership of the data, encrypting the new data block with a block-unique encryption key and storing the encrypted new data block in the storage with a key that is equal to the first hash value, storing a first ownership record in the ledger, the first ownership record comprising the identity of the first host, the first hash value unencrypted, and the set of confirmation data encrypted with a key known only to the first host, if the first hash value is found in the ledger, obtaining from the ledger information about a second host that has already stored a previous block identical to the new data block in the storage, entering in the ledger a key request for the key to the previous block, the key request comprising the set of confirmation data, encrypted with the public key of the second host, receiving from the ledger a key transfer record stored by the second host, the key transfer record comprising the key to the data encrypted with the public key of the first host, sending to the ledger a new ownership record that the first host has been given ownership of the data block.

The present disclosure provides an improved method for deduplication of data that is stored in the storage that is common to two or more hosts which may not trust each other, for example in a cryptographic data storage system. In the present disclosure, the data blocks are stored in an encrypted form in the storage and the first hash value is used for identifying each data block. As a result, when a new data block is to be stored by the first host, the first hash value of new data block is compared with the first hash value of data blocks already stored in the storage. If the first hash values are identical, the new data block is not stored and the ownership of already stored data block (similar to new data block) is given to the first host. If the first hash values are not identical, the new data block is stored and ownership of new data block is given to the first host. Thus, new data block is identified if already existing in the storage before being stored in a storage which is common to two or more hosts which may not trust each other.

In an implementation form, the key request comprises the first hash value unencrypted and the set of confirmation data encrypted along with data about the requesting host with the public key of the second host.

The first hash value in an unencrypted form enables other hosts in the network to easily access the first hash value. Further, the data about the requesting host in the key request enables in keeping record of the requesting host (i.e. first host) and the second host in the ledger.

In a further implementation form, the key transfer record further comprises the hash value of the data and the identity of the first host.

By virtue of the key transfer record, the record of the key request between the first host and the corresponding hash value of the new data block is stored in the ledger for future use.

In a further implementation form, the first and the new ownership record also comprises the private key encrypted with the public key of the first host.

This allows the other hosts in the network to communicate with the first host regarding the first ownership record using the public key of the first host and at the same time keeping access of the data of the new data block with the first host.

In a further implementation form, the set of confirmation data calculated by the second host is stored in the ledger, encrypted by the private key of the second host.

The encryption of the set of confirmation data with a secret key known only to the second host enables the ledger to maintain the ownership of the previous block with the second host.

In a further implementation form, the set of confirmation data comprises a second hash value.

The second hash value is stored in encrypted form and is available upon confirmation that the first hash values of the new data block and previously stored data blocks are identical. As a result, duplicate data is prevented to be stored between hosts which do not trust each other.

In another aspect, the present disclosure provides a method of preventing duplication of data in a storage, arranged in a network in which two or more hosts can store data in the network, the storage comprising one or more encrypted data blocks, the network further comprising a distributed ledger, accessible to each of the two or more hosts and holding, for each of the one or more encrypted data blocks, a hash identifying the data block, the method comprising the following steps, performed by a second host of the two or more hosts when a first host wishes to store a new data block in the storage, the new data block being identical to a previous block of data stored in the storage by the second host: receiving from the ledger a key request stored in the ledger by the first host for the key to the previous block, said key request comprising proof that the new data block is identical to the previous block of data, evaluating the proof, and if the new and previous blocks are found to be identical, providing from the ledger to the first host a key transfer record including the key to the data encrypted with the public key of the first host.

The present disclosure provides an improved method for deduplication of data that is stored in the storage that is common to two or more hosts which may not trust each other. In the present disclosure, when a new data block is to be stored by the first host, the first hash value of new data block is compared with the first hash value of data blocks already stored in the storage. The present disclosure, evaluates that the new data block is identical to the previously stored block of data. If the first hash values are identical, the new data block is not stored and the ownership of already stored data block (similar to new data block) is given to the first host. Thus, new data block is identified if already existing in the storage before being stored in a storage which common to two or more hosts which may not trust each other.

In an implementation form, the key request comprises a first hash value and a second hash value calculated by the first host based on the new data block, the first hash value being unencrypted, and the second hash value being encrypted with the public key of the second host.

The first hash value in an unencrypted form enables other hosts in the network to easily access the first hash value. Further, the data about the requesting host in the key request enables in keeping record of the requesting host (i.e. first host) and the second host in the ledger.

In a further implementation form, the step of evaluating the proof comprises comparing the second hash value to a second hash value calculated by the second host, and determining that the new and previous blocks are identical if the second hash values are identical.

Based on the comparison, the duplication of data is prevented. As a result, deduplication of data is executed between two hosts which do not trust each other.

In a further implementation form, the key transfer record indicates the hash value of the data, the identity of the first host and the key to the data encrypted with the public key of the first host.

By virtue of the key transfer record, the record of the key request between the first host and the corresponding hash value of the new data block is stored in the ledger for future use.

In a further implementation form, the second hash value calculated by the second host is stored in the ledger, encrypted by the private key of the second host.

The second hash value is stored in encrypted form to protect the second hash value to be accessed by unauthorized users. As a result, the present disclosure protects the data from unauthorized access and also prevents duplication between hosts that do not trust each other.

In yet another aspect, the present disclosure provides a method of preventing duplication of encrypted data in a storage arranged in a network in which two or more hosts can store data in the network, the storage comprising one or more encrypted data blocks, the network further comprising a distributed ledger, accessible to each of the two or more hosts and holding, for each of the one or more encrypted data blocks, a hash value identifying the data block, the method comprising the following steps when a first host of the two or more hosts attempts to store a new data block in the storage, determining if the new data block is identical to a block already stored in the storage by comparing a hash value calculated for the new data block to at least one hash value found in the ledger, if an identical hash value is found, identifying a second host which stored the identical hash value and the data block that it identifies, presenting, by the second host, a key allowing the first host access to the already stored block for which the identical hash value was calculated, if an identical hash value is not found, allowing the first host to store the encrypted new data block to the storage and storing the hash value calculated for the new data block in the ledger.

The present disclosure provides an improved method for deduplication of data that is stored in the storage that is common to two or more hosts which may not trust each other. When a new data block is to be stored by the first host, the first hash value of new data block is compared with the first hash value of data blocks already stored in the storage. If the first hash values are identical, the new data block is not stored and the ownership of already stored data block (similar to new data block) is given to the first host. If the first hash values are not identical, the new data block is stored and ownership of new data block is given to the first host. Thus, new data block is identified if already existing in the storage before being stored in a storage that is common to two or more hosts which may not trust each other.

In an implementation form, the method comprises the step of obtaining the new data block by dividing a set of data into two or more blocks, of the same size or of variable size.

The data that is to be stored is divided into blocks of data. The blocks of data are further checked if are already present in the storage to prevent any duplicate blocks of data to be stored between two or more hosts that do not trust each other.

In a further implementation form, the ledger is a blockchain.

The blockchain enables in keeping a record of the blocks of data that are stored in the storage. As a result, duplicate blocks of data are prevented from being stored in the storage.

In a further implementation form, the blockchain is a hyperledger.

The hyperledger maintains a record of the blocks of data that are stored in the storage. As a result, duplicate blocks of data are prevented from being stored in the storage.

In another aspect, the present disclosure provides a computer program product comprising computer-readable code means which, when run in a processor of a host in a computer network comprising a storage holding encrypted data, said storage being accessible by the host and one or more other hosts will cause the host to perform the method executed by the first host in previous aspect.

The present disclosure provides an improved computer program product, executed at first host, for deduplication of data that is stored in the storage that is common to two or more hosts which may not trust each other. Beneficially, new data block is identified if already existing in the storage before being stored in a storage which is common to two or more hosts which may not trust each other.

In yet another aspect, the present disclosure provides a computer program product comprising computer-readable code means which, when run in a processor of a host in a computer network comprising a storage holding encrypted data, said storage being accessible by the host and one or more other hosts will cause the host to perform the method executed by the second host in previous aspect.

The present disclosure provides an improved computer program product, executed at second host, for deduplication of data that is stored in the storage that is common to two or more hosts which may not trust each other. Beneficially, new data block is identified if already existing in the storage before being stored in a storage which is common to two or more hosts which may not trust each other.

In an implementation form, a computer program product comprises a non-transitory storage means having thereon the computer-readable code means.

By virtue of the non-transitory storage having computer-readable code means, an improved computer program product is provided which enable deduplication of data that is stored in the storage that is common to two or more hosts which may not trust each other.

In another aspect, the present disclosure provides a first host for use in a data network comprising a storage holding encrypted data, said storage being accessible by the host and one or more other hosts, the first host comprising a program memory and a processor for executing a program found in the program memory, wherein the program memory comprises a computer program product.

The present disclosure enables the first host to store data in the storage in a way that deduplicate data that may be stored by the first host in the storage is identified, even when two or more hosts (such as the first host, a second host, a third host and so on) which may not trust each other access the same storage.

In yet another aspect, the present disclosure provides a second host for use in a data network comprising a storage holding encrypted data, said storage being accessible by the host and one or more other hosts, the host comprising a program memory and a processor for executing a program found in the program memory, wherein the program memory comprises a computer program product.

The present disclosure enables the second host to execute deduplication of data that may be attempted to be stored by a first host in the storage, even when two or more hosts (such as the first host, the second host, a third host and so on) do not trust each other.

In another aspect, the present disclosure provides a computer system comprising a storage holding encrypted data and at least a first and a second host, said storage being accessible by the first host and the second host.

The present disclosure provides an improved computer system for deduplication of data that is stored in the storage that is common to two or more hosts (such as the first host and the second host) which may not trust each other.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
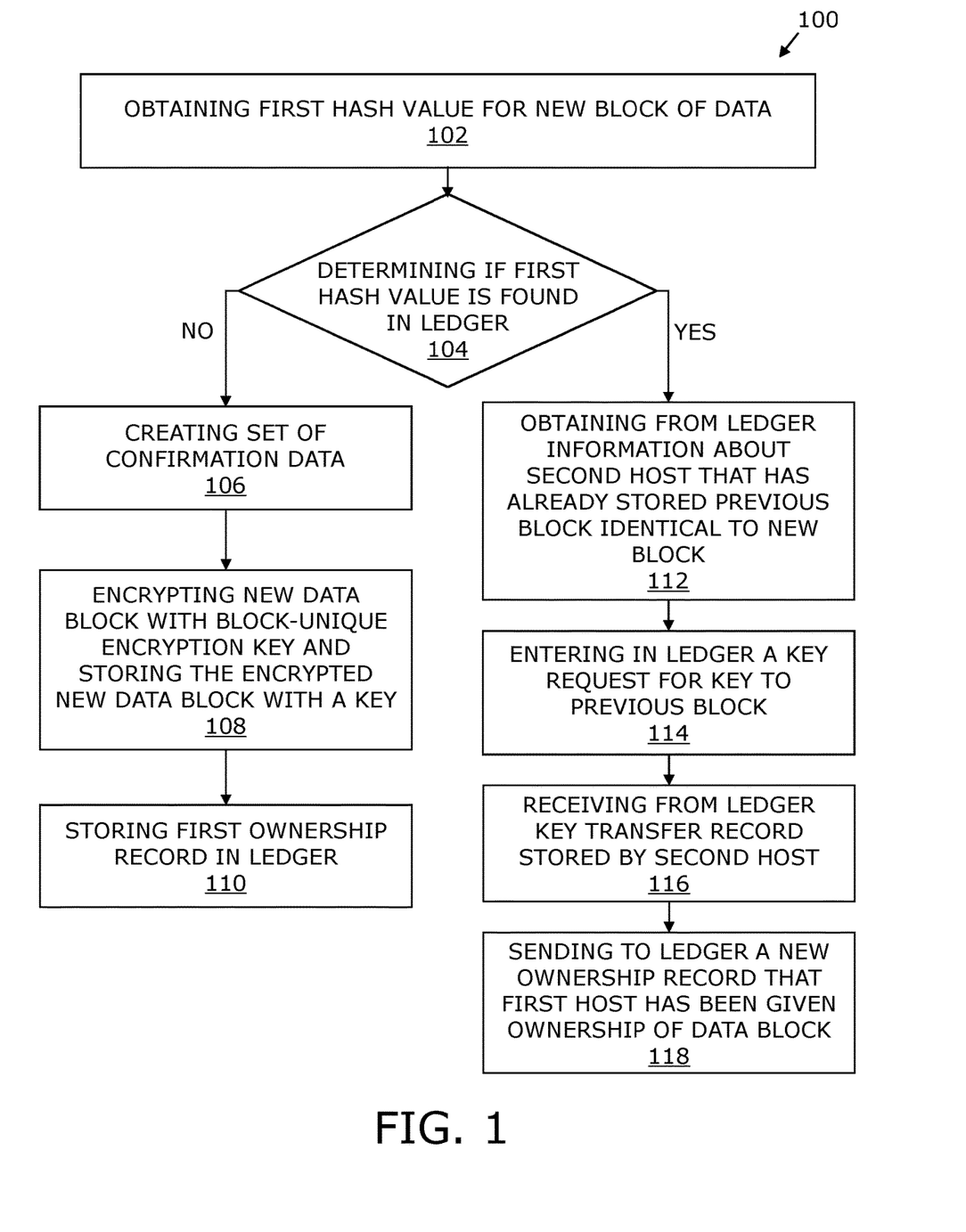
FIG. 1 is a flowchart of a method of preventing duplication of encrypted data in a storage, the method is performed by a first host arranged in a network in which two or more hosts can store data in the network, in accordance with an embodiment of the present disclosure.

FIG. 1 is a flowchart of a method 100 of preventing duplication of encrypted data in a storage, performed by a first host, arranged in a network in which two or more hosts can store data in the network, in accordance with an embodiment of the present disclosure. The method 100 includes the steps 102 to 116, performed by the first host of the two or more hosts, when the first host wishes to store a new data block in the storage. The method 100 is executed at the first host, shown and explained in greater detail in FIG. 4A.

The method 100 prevents duplication of the encrypted data in the storage. Duplication of the encrypted data refers to storing of a particular data (for example an original/same data) more than once in the storage. Duplication results in unnecessary occupation of storage space by duplicate copy(s) of the same data. Moreover, it causes reduction in performance of the storage. Moreover, the cost of data storage, with all the associated costs including cost of storage hardware, continues to increase with duplicate copies of original data. The method of the present disclosure protects the storage from reduced performance by preventing duplication of the encrypted data. Encrypted data refers to the data that is stored in the storage in an encrypted form and thereby making the accessibility of data using only the encryption keys. The data is encrypted using encryption algorithms. The data stored in the network may be referred to as any information stored as text documents, pictures, videos and the like which needs secure storage, preventing access by any unauthorized users. In other words, the method 100 prevents duplication of the encrypted data for a cryptographic data storage system The method 100 further relates to the storage comprising one or more encrypted data blocks, the network further comprising a distributed ledger, accessible to each of the two or more hosts and holding, for each of the one or more encrypted data blocks, a first hash value identifying the data block. Storage herein refers to centralized cloud storage, which may be an object storage, such as a key/value storage. The storage is configured to reliably store the data in form of one or more encrypted data blocks provided by the two or more hosts. Each of the one or more encrypted data blocks includes data of a fixed size. Further, the storage is not trusted by the two or more hosts i.e. the two or more hosts trust that the storage will store the data and not lose the data, but the data may be leaked (i.e. accessed by unauthorized users). Network herein refers to a group of hosts (i.e. two or more hosts) that are connected to share and store data in a common storage. The host (may also referred to as a computing device) includes suitable logic, circuitry, interfaces, and/or code that is configured to store, process and/or share data with one or more hosts via the network. The host is described in detail later in the description. The distributed ledger is a database that is shared and synchronized with multiple parties (such as the first host, the second host and the like) to store the one or more encrypted data blocks. The distributed ledger may simply be referred to as a ledger.

According to an embodiment, the ledger is a blockchain. The blockchain is an open, distributed ledger that can record transactions (i.e. changes) between two hosts efficiently and in a verifiable and permanent way. The blockchain is a ledger, which is immutable and can be used with untrusted hosts wherein one host may not trust another host in the network. For use as a distributed ledger, the blockchain is typically managed by a peer-to-peer network collectively adhering to a protocol for inter-node communication and validating new data blocks of data. Although, blockchain records are not unalterable, the blockchain may be considered secure by design and exemplify a distributed computing system with high Byzantine fault tolerance. Decentralized consensus is therefore achieved with a blockchain.

According to an embodiment, the blockchain is a hyperledger. In an example, blockchain or any distributed ledger such as hyperledger may be used for maintaining meta data of the encrypted data stored in the storage.

Each of the one or more encrypted data blocks stored in the storage includes the first hash value identifying the respective data block. The hash value refers to fixed sized values of data having arbitrary sizes generated using hash functions or hashing algorithms. In other words, hash values refer to fixed sized values that represents original data having arbitrary sizes. In an example, hash value is a hexadecimal string of several characters representing the data. Examples of hashing algorithm include but are not limited to SHA-2, MD5. Beneficially, hash values enable comparison between two blocks of data without actual comparing between data of the two blocks. The first hash value refers to the hash value generated for the data block for the first time by a particular host in the network. The first hash value enables in identification and prevention of storage of duplicate data blocks by hosts.

According to an embodiment, the method comprises the step of obtaining the new data block by dividing a set of data into two or more blocks, of the same size or of variable size. The first host is configured to break the data to store in the storage, into variable (or fixed) size pieces i.e. data block(s) using a data chunking algorithm. Based on the data chunking algorithm the data is formed into data blocks by the first host. In an embodiment, the new data block is generated by the first host.

At step 102, the method 100 further comprises obtaining a first hash value for the new data block. The first host is configured to obtain the first hash value by applying a hash function or hashing algorithm to the new data block. The first hash value enables in distinct identification of the new data block in comparison to one or more encrypted data blocks already stored in the storage. In will be evident that, a similar hash value will be generated for a given block of data irrespective of the host applying the hashing algorithm.

At step 104, the method 100 further comprises determining if the first hash value is found in the ledger. The determination of whether the first hash value is found in the ledger is performed by comparing the first hash value generated for the new data block with each of hash values of one or more encrypted data blocks stored in the storage. In an example, the method may employ a comparator function to compare the aforesaid hash values. In another example, upon comparison of the aforesaid hash values if the first hash value is found in the ledger, a true signal (yes) is generated and if the first hash value is not found in the ledger, a false signal (no) is generated. Beneficially, the determining of whether the first hash value is found in the ledger enables the method to prevent duplication of already existing data in the storage.

If based on the determination, the first hash value is not found in the ledger, the steps 106, 108, and 110 are executed. If based on the determination, the first hash value is found in the ledger, the steps 112, 114, 116 and 118 are executed.

At step 106, the method 100 further comprises creating a set of confirmation data that constitute proof that the first host has ownership of the data. As the new data block of the data is not found in the ledger, the set of confirmation data is created to enable the first host to have ownership of the new data block of the data that will be added to the ledger. The set of confirmation data may indicate that the new data block, to be added in the blockchain, is create by the first host. The creation of the set of confirmation data allows verification that another host holds the same data.

According to an embodiment, the set of confirmation data comprises a second hash value. The second hash value is created by applying the hashing algorithms known in the art. The second hash value provides enhanced security to the new data block whereas the first hash value enables identification of duplicate data block in the ledger.

At step 108, the method 100 further comprises encrypting the new data block with a block-unique encryption key and storing the encrypted new data block in the storage with a key that is equal to the first hash value. The block-unique encryption key used for encrypting the new data block is created by the first host. The new data block is stored in the storage in an encrypted form to prevent access of the new data block by any unauthorized users or hosts in the network. According to an embodiment, the new data block may contain confidential information associated with the first host. The encryption of the new data block prevents information theft of such confidential information by unauthorised users. The new data block is encrypted with the block-unique encryption key using encryption algorithms that are known in the art. The block-unique encryption key is a unique encryption key that is used specifically for encryption of a respective block of data, such as the new data block. As a result, the new data block may be accessed only using the block-unique encryption key. The key that is equal to the first hash value is also stored in the storage with the encrypted new data block. This enables other hosts of the network to identify if a given new data block associated with a given other host is present in the ledger.

According to an embodiment, the first host is further configured to store a private meta data regarding the new data block with some secret key known only to the first host to enable recovery (via decryption) of the new data block whenever needed.

At step 110, the method 100 further comprises storing a first ownership record in the ledger, the first ownership record comprising an identity of the first host, the first hash value unencrypted, and the set of confirmation data encrypted with a key known only to the first host. In an example, the first ownership record includes the identity of the first host, such as a serial number of a computing device. Otherwise, the first ownership record may include any identity provided to the first host upon joining the network. The identity of the first host essentially has to be unique with respect to other hosts in the network. In an example, the first hash value is stored in plain text. The first hash value is stored in plain text (in a non-encrypted manner) for allowing other hosts in the network to read the first hash value without a permission of the first host. Moreover, the first ownership record may include the block-unique encryption key used for encrypting the new data block by the first host. The set of confirmation data is encrypted with the key to prevent access to the set of confirmation data by any host without the permission of the first host. In an example, the key is created by the first host. The first ownership record enables in recovery of the new data block from the storage whenever needed based on the identity of the first host, the unencrypted first hash value, and the set of confirmation data.

According to an embodiment, the first ownership record also comprises the secret key known only to the first host encrypted with the public key of the first host. In other words, the secret key known to the first host may also be stored in the ledger encrypted with the public key of the first host. The secret key is encrypted with the public key to protect the secret key from access by any unauthorized users and to further prevent access of the set of confirmation data associated with the new data block of first host. The public key is published and thus known by all hosts] Further, the encryption of the secret key with the public key of the first host allows other hosts in the network to have access of the public key of the first host. This would allow the other hosts in the network to communicate with the first host regarding the first ownership record using the public key of the first host.

At step 112, the method 100 further comprises obtaining from the ledger, information about a second host that has already stored a previous block identical to the new data block in the storage. Once the first hash value of the new data block is found in the ledger, the second host owning the previous block possibly carrying same hash value that of the first hash value is identified. The ledger information about the second host having the previous block is obtained based on an ownership record associated with the second host having the ownership of the previous block, which is previously stored in the ledger. Typically, the first hash value of the new data block is compared with hash value(s) present in the ledger for the existing previous block(s) to identify the second host that has stored or owning the previous block identical to the new data block. In an example, the ledger information about the second host includes an identity of the second host, a hash value (equivalent to the first hash value of the new data block) unencrypted for the previous block, a set of confirmation data (for the previous block) encrypted with a key known only to the second host, and a block-unique encryption key used for encrypting the previous block by the second host. Further, the key, used for encrypting the set of confirmation data of previous block, is encrypted with a public key of the second host. Notably, the first host requests for ledger information about the second host after determining that the first hash value of the new data block is found in the ledger.

At step 114, the method 100 further comprises entering in the ledger a key request for the key to the previous block, the key request comprising the set of confirmation data, encrypted with the public key of the second host. Once the first hash value of the new data block is found in the ledger the key request for the key of the previous block is made by the first host to the second host. Typically, the key request indicates or relates to a communication (or transaction) between the first host and the second host regarding the request of the key for the previous block. In an example, the key request may be stored in the blockchain indicating the possible communication or transaction between the first and second host regarding requesting of the key for the previous block. The key request is entered in the ledger by the first host to receive from the second host, the set of confirmation data encrypted with the public key of the second host. The key request enables the first host to enable validation that the new data block is already present in the ledger after determining that the first hash value of the new data block is found in the ledger.

According to an embodiment, the key request comprises the first hash value unencrypted and the set of confirmation data encrypted along with data about the requesting host with the public key of the second host. The key request includes the first hash value unencrypted because this allows the ledger to keep the record of the communication or transaction between the first and second host regarding requesting of the key for the previous block. Further, the unencrypted nature of the first hash value with respect to the key request allows the ledger to make the other hosts in the network to identify such key request. Further, the key request includes the set of confirmation data, i.e. ownership data regarding data contained in the previous block is owned by the second host. The key request also includes data about the requesting host, i.e. the first host requesting key form the second host. Based on the set of confirmation data encrypted with public key of the second host, the first host checks that the set of confirmation data sent by the second host is identical to the set of confirmation data calculated by the first host. As a result, the new data block is confirmed to be already present in the ledger.

According to an embodiment, the set of confirmation data calculated by the second host is stored in the ledger, encrypted by the private key of the second host. The set of confirmation data (or ownership data) is created by the second host to enable the second host to have ownership of the previous block in the ledger. The creation of the set of confirmation data prevents addition of duplicate data blocks similar to the previous block, by any other hosts of the network. Further, the encryption of set of confirmation data using the private enables the second host to prevent an access of the previous block stored in the ledger by any unauthorised user. According to an embodiment, the set of confirmation data calculated by the second host comprises a second hash value.

At step 116, the method 100 further comprises receiving from the ledger a key transfer record stored by the second host, the key transfer record comprising the key to the data encrypted with the public key of the first host. As mentioned herein above, the first host makes the request for the key of the previous block from the second host, therefore the second host accepts the request of the first host and shares the key of the previous block with the first host. Accordingly, the key transfer record, i.e. communication or transaction between the first and second hosts regarding key exchange, is maintained in the ledger or blockchain. Typically, the second host adds the key transfer record into the ledger after sharing the requested key for the previous block with the first host. The key transfer record includes the key to the data encrypted with the public key of the first host because this allows only the first host (baring other hosts in the network) to have access to the key (shared by the second host) using the private key of the first host.

According to an embodiment, the key transfer record further comprises the hash value of the data and the identity of the first host. According to an example, the hash value of the data relates to transaction details between the first and second hosts regarding the exchange of the requested key. The hash value of the data is stored in the ledger to maintain a record that the second host shared the requested key for the previous block with the first block. The key transfer record also includes the identity of the first host indicating the key request is made by the first host. In an example, the identity of the first host may be a serial number which is unique to the first host. Otherwise, the first ownership record may include any identity provided to the first host upon joining the network.

At step 118, the method 100 further comprises sending to the ledger a new ownership record that the first host has been given ownership of the data block. Once, the key transfer record is entered (stored or recorded) in the ledger based on sharing the requested key by the second host to the first host, the new ownership record is entered into the ledger. The new ownership record typically includes information that the first host has been given ownership of the previous block, which was earlier owned by the second host. The sending of the new ownership record to the ledger enables the ledger to provide ledger information about the first host to any other hosts of the network whenever the other hosts want to store a data block similar to the new data block already stored in the ledger. In an example, the new ownership record comprises the identity of the first host, the first hash value unencrypted, and the set of confirmation data encrypted with the key known only to the first host. The shifting of the ownership data of the previous block precludes the first host from adding the new data block (which is similar to the previous block and owned by the second host) into the storage. This enables in data deduplication that saves space in the storage.

According to an embodiment, the new ownership record also comprises secret key encrypted with the public key of the first host. The private key is encrypted with the public key to protect the private key from access by any unauthorized users and to further prevent access of the set of confirmation data associated with the new data block of first host.

The steps 102 to 118 are only illustrative and other alternatives can also be provided where one or more steps are added, one or more steps are removed, or one or more steps are provided in a different sequence without departing from the scope of the claims herein.

In one aspect, provided is a computer program product comprising a comprising computer-readable code means which, when run in a processor of a host in a computer network comprising a storage holding encrypted data, said storage being accessible by the host and one or more other hosts will cause the host to perform the method 100. In an example, the computer-readable code are executed by the first host in the network, such as the cryptographic data storage network. Further, examples of a computer readable storage, of the computer program product, for providing a non-transient memory may include, but is not limited to, an electronic storage device, a magnetic storage device, an optical storage device, an electromagnetic storage device, a semiconductor storage device, or any suitable combination of the foregoing.

According to an embodiment, the computer program product comprises a non-transitory storage means having thereon the computer-readable code means. Examples of implementation of the non-transitory computer-readable storage means include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Figure 2:
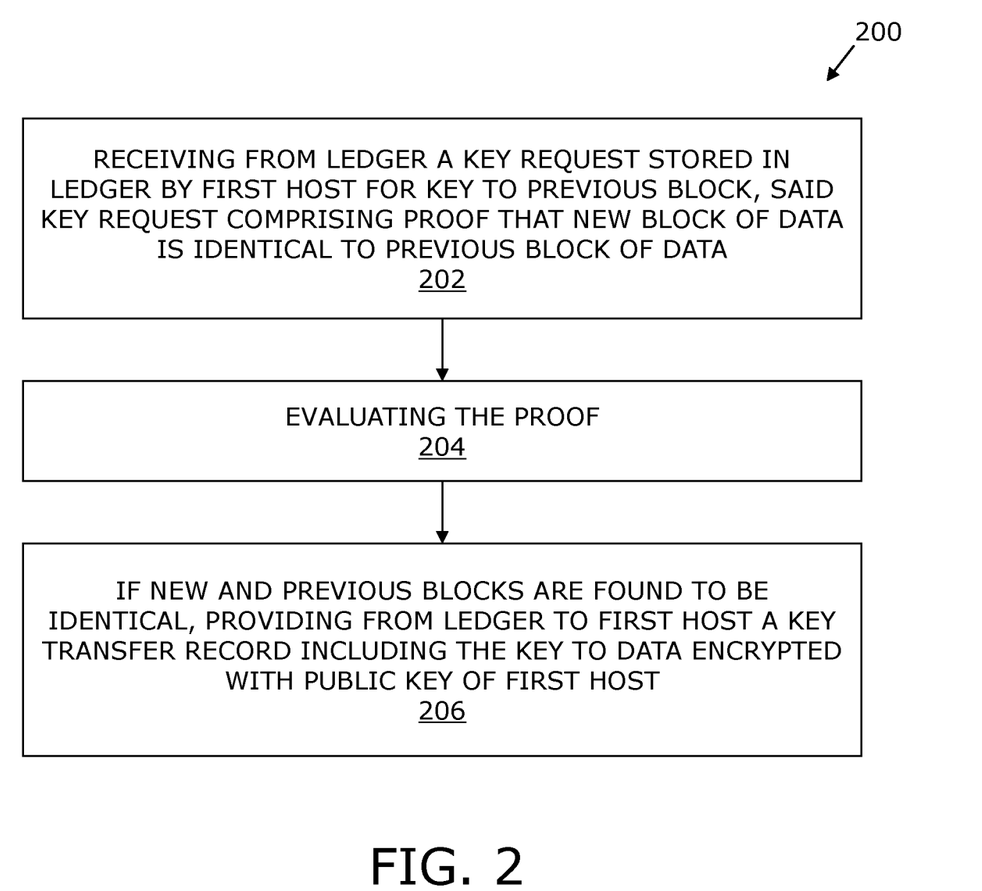
FIG. 2 is a flowchart of a method of preventing duplication of encrypted data in a storage, the method is performed by a second host arranged in a network in which two or more hosts can store data in the network, in accordance with an embodiment of the present disclosure.

Referring now to FIG. 2, illustrated is a flowchart of a method 200 of preventing duplication of encrypted data in a storage, performed by a second host, arranged in a network in which two or more hosts can store data in the network, in accordance with an embodiment of the present disclosure. The method 200 includes the steps 202 to 206, performed by the second host of the two or more hosts when the first host wishes to store a new data block in the storage, the new data block being identical to a previous block of data stored in the storage by the second host. The method 200 is executed at the second host, shown and explained in greater detail in FIG. 4B.

The method 200 further relates to the storage comprising one or more encrypted data blocks, the network further comprising a distributed ledger, accessible to each of the two or more hosts and holding, for each of the one or more encrypted data blocks, a hash identifying the data block. The method 200 further comprises the following steps 202 to 206, performed by the second host of the two or more hosts when a first host wishes to store a new data block in the storage, the new data block being identical to a previous block of data stored in the storage by the second host.

At step 202, the method 200 further comprises receiving from the ledger, a key request stored in the ledger by the first host for the key to the previous block, said key request comprising proof that the new data block is identical to the previous block of data. The first host is configured to provide the key request to the ledger upon determining that a first hash value of the new data block is found in the ledger by comparing the first hash value of the new data block with a first hash value of the previous block of data. The first host provides the key request to get ownership of the previous block which is similar to the new data block. The key request relates to a communication (or transaction) between the first host and the second host regarding the request of the key for the previous block. The key request is entered in the ledger by the first host to receive from the second host, a set of confirmation data encrypted with the public key of the second host. The key request enables the first host to enable validation that the new data block is already present in the ledger after determining that the first hash value of the new data block is found in the ledger.

According to an embodiment, the key request comprises a first hash value and a second hash value calculated by the first host based on the new data block, the first hash value being unencrypted, and the second hash value being encrypted with the public key of the second host. The first hash value enables in distinctly identifying the new data block in comparison to one or more encrypted data blocks already stored in the storage. In an example, the first host receives the second host's public key from the ledger upon determining that the first hash value of the new data block is found in the ledger. The first hash value and the second hash value enable to evaluate if the new data block is similar to previous blocks of data stored in ledger. The first hash value is obtained by the first host as described in the step 102 of FIG. 1. The first hash value and the second hash value enable in providing proof that the new data block is identical to the previous block of data.

At step 204, the method 200 further comprises evaluating the proof. The second host is configured to receive the key request from the ledger. Based on the key request received, the second host evaluates the proof to determine that the new data block is identical to the previous block of data. The evaluation of the proof is performed by comparison of the hash values.

According to an embodiment, the step of evaluating the proof comprises comparing the second hash value to a second hash value calculated by the second host, and determining that the new and previous blocks are identical if the second hash values are identical. The second hash value of the new data block calculated by the first host is compared with the second hash value of previous block calculated by the second host. In an example, if the second hash values are identical than the new data block of the first host is similar to the previous block of the second host. In another example, if the second hash values are not identical than the new data block of the first host is dissimilar to the previous block of the second host.

According to an embodiment, second hash value calculated by the second host is stored in the ledger, encrypted by the private key of the second host. The second hash value enables the second host to prevent any unauthorized access of the previous block stored in the ledger. The calculation of the second hash value prevents addition of duplicate data blocks similar to the previous block, by any other host of the network.

At step 206, the method 200 further comprises if the new and previous blocks are found to be identical, providing from the ledger to the first host a key transfer record including the key to the data encrypted with the public key of the first host. The first host makes the request for the key of the previous block from the second host, therefore the second host accepts the request of the first host and shares the key of the previous block with the first host. Accordingly, the key transfer record, i.e. communication or transaction between the first and second hosts regarding key exchange, is maintained in the ledger or blockchain. Typically, the second host adds the key transfer record into the ledger after sharing the requested key for the previous block with the first host. The key transfer record includes the key to the data encrypted with the public key of the first host because this allows only the first host to have access to the key using private key of the first host.

According to an embodiment, the key transfer record indicates the hash value of the data, the identity of the first host and the key to the data encrypted with the public key of the first host. In other words, the key transfer record includes the hash value of the previous block of data, an identification value of the first host with access to the previous block, and the key used for encryption of the previous block. According to an example, the hash value of the data relates to transaction details between the first and second hosts regarding the exchange of the requested key. The key transfer record also includes the identity of the first host indicating the key request is made by the first host.

The steps 202 to 206 are only illustrative and other alternatives can also be provided where one or more steps are added, one or more steps are removed, or one or more steps are provided in a different sequence without departing from the scope of the claims herein.

In another aspect, the present disclosure provides a computer program adapted to perform the method 200 when executed on a second host. In yet another aspect, provided is computer program product comprising computer-readable code means which, when run in a processor of a host in a computer network comprising a storage holding encrypted data, said storage being accessible by the host and one or more other hosts will cause the host to perform the method 200. In an example, the computer-readable code is executed by the second host in the network, such as the cryptographic data storage network.

According to an embodiment, the computer program product comprises a non-transitory storage means having thereon the computer-readable code means.

Figure 3:
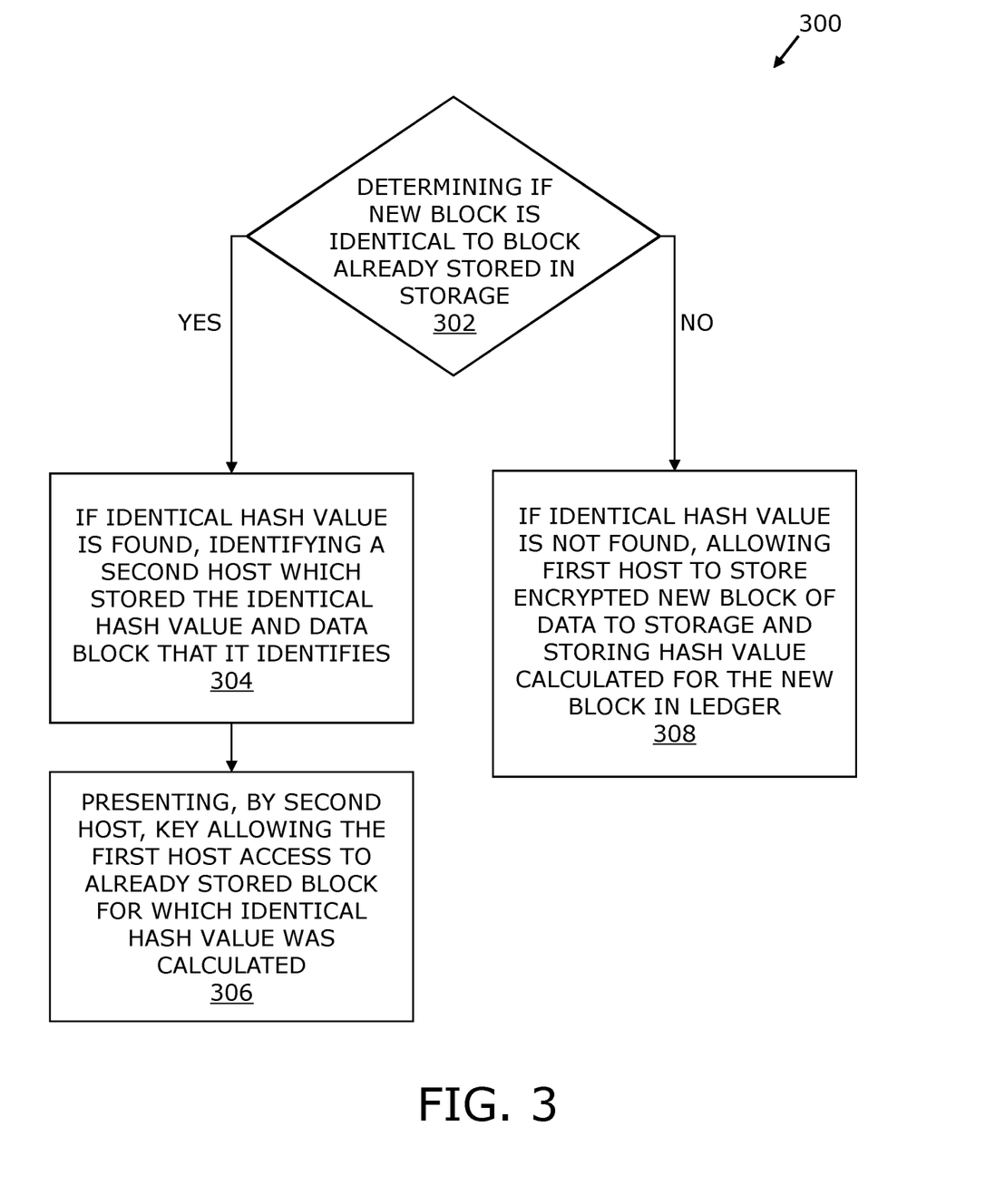
FIG. 3 is a flowchart of a method of preventing duplication of encrypted data in a storage arranged in a network in which two or more hosts can store data in the network, in accordance with an embodiment of the present disclosure.

Referring now to FIG. 3, illustrated is a flowchart of a method 300 of preventing duplication of encrypted data in a storage arranged in a network in which two or more hosts can store data in the network, in accordance with an embodiment of the present disclosure. The method 300 includes steps 302 to 308. The method 300 includes the steps 302 to 308, performed when a first host of two or more hosts attempts to store a new data block in the storage.

The method 300 further relates to the storage comprising one or more encrypted data blocks, the network further comprising a distributed ledger, accessible to each of the two or more hosts and holding, for each of the one or more encrypted data blocks, a hash value identifying the data block. The method 300 further comprises the following steps 302 to 308 to when a first host of the two or more hosts attempts to store the new data block in the storage.

At step 302, the method 300 further comprises determining if the new data block is identical to a block already stored in the storage by comparing a hash value calculated for the new data block to at least one hash value found in the ledger. In other words, the first hash value of the new data block is compared with the first hash value of the data blocks already stored (i.e. previous block of data) in the ledger. Based on the comparison, if the two hash values are similar than the new data block is identical to the block already stored in the storage thus, a true signal (yes) is generated and if the two hash values are dissimilar than the new data block is not identical to any block already stored in the storage thus, a false signal (no) is generated.

Based on the determination, if the new data block is identical to a block already stored in the storage, the steps 304 and 306 are executed. If new data block is not identical to a block already stored in the storage, the step 308 is executed.

At step 304, the method 300 further comprises, if an identical hash value is found, identifying a second host which stored the identical hash value and the data block that it identifies. Once the hash value of the new data block is found in the ledger, the second host owning a previous block (which is already stored) possibly carrying same hash value that of the hash value is identified. Ledger information about the second host having the previous block is obtained based on an ownership record associated with the second host having the ownership of the previous block, which is previously stored in the ledger. The hash value of the new data block is compared with hash value(s) present in the ledger for the existing previous block(s) to identify the second host that has stored or owning the previous block identical to the new data block.

At step 306, the method 300 further comprises presenting, by the second host, a key allowing the first host access to the already stored block for which the identical hash value was calculated. The key enables the first host to gain ownership of already stored block. In an example, the first host enter in the ledger a key request for the key to the already stored block (i.e. the previous block), the key request comprising a set of confirmation data, encrypted with a public key of the second host. Further, the first host receives from the ledger a key transfer record stored by the second host, the key transfer record comprising the key to the data encrypted with the public key of the first host. Once, the key transfer record is entered (stored or recorded) in the ledger based on sharing the requested key by the second host to the first host, the new ownership record is entered into the ledger. The new ownership record typically includes information that the first host has been given ownership of the previous block, which was earlier owned by the second host. As a result, the first host sends to the ledger an ownership record that the first host has been given ownership of the data block. In an example, the ownership record may include an identification number of first host, a first hash value of data block already stored, and a key encrypted with the first host's public key.

At step 308, the method 300 further comprises, if an identical hash value is not found, allowing the first host to store the encrypted new data block to the storage and storing the hash value calculated for the new data block in the ledger. If the new data block of the data is not found in the ledger, the set of confirmation data is created to enable the first host to have ownership of the new data block of the data that will be added to the ledger. The new data block is encrypted with the block-unique encryption key and the encrypted new data block is stored in the storage. Ownership record comprising an identity of the first host, the hash value unencrypted, and the set of confirmation data encrypted with a key known only to the first host is stored in the ledger.

The steps 302 to 308 are only illustrative and other alternatives can also be provided where one or more steps are added, one or more steps are removed, or one or more steps are provided in a different sequence without departing from the scope of the claims herein.

In another aspect, the present disclosure provides a computer program adapted to perform the method 300. In yet another aspect, there is provided a computer program product comprising computer-readable code means which, when run in a processor of a host in a computer network comprising a storage holding encrypted data, said storage being accessible by the host and one or more other hosts will cause the host to perform the method 300.

Figure 4A:
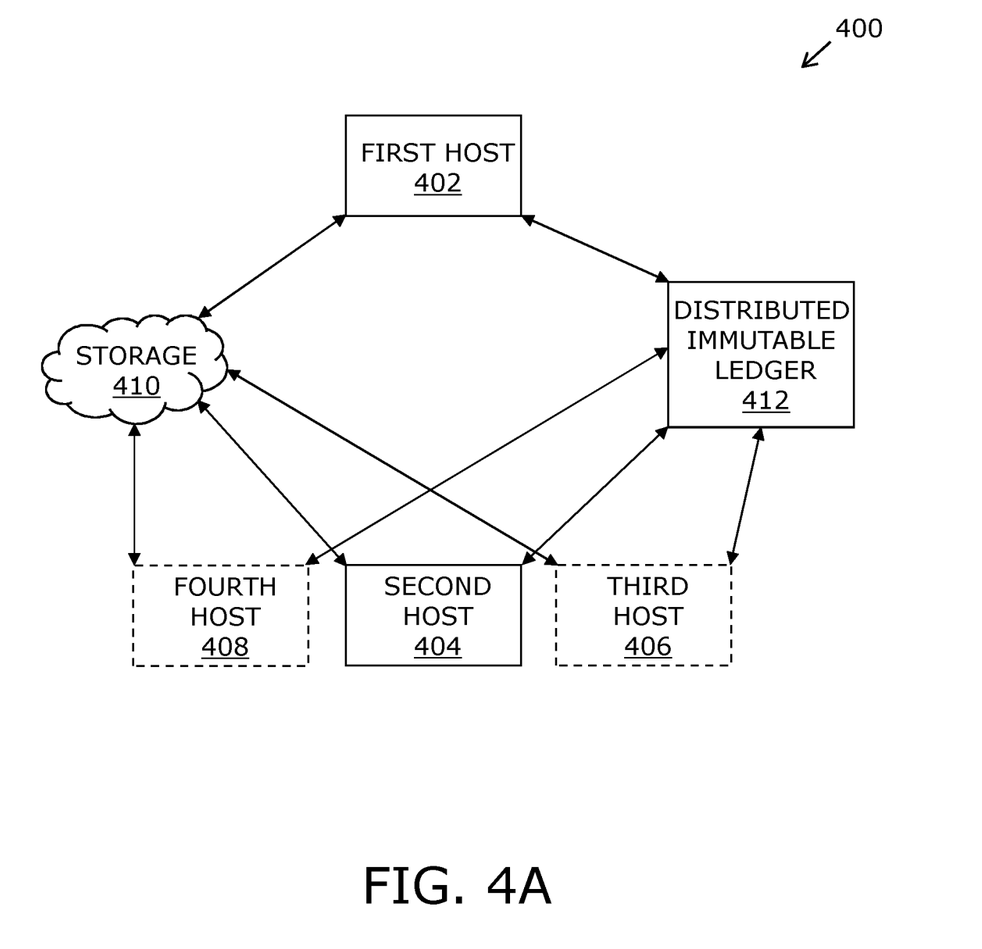
FIG. 4A is a network environment diagram of a computer system for preventing duplication of encrypted data in a storage, in accordance with an embodiment of the present disclosure.

Referring now to FIG. 4A, illustrated is a network environment diagram of a computer system for preventing duplication of encrypted data in a storage, in accordance with an embodiment of the present disclosure. With reference to FIG. 4A, there is shown a computer system 400. The computer system 400 includes a first host 402, a second host 404, a third host 406 and a fourth host 408. The computer system 400 further includes a storage 410 and a distributed ledger 412. The first host 402, the second host 404, the third host 406 and the fourth host 408 can access and store encrypted data in the storage 410 and access the distributed ledger 412.

The term host (may also referred to as host device) includes suitable logic, circuitry, interfaces, and/or code that is configured to store, process and/or share information with one or more hosts in the storage 410 via the distributed ledger 412. Examples of the host include, but is not limited to a host server, a host production environment system, a thin client connected to the host server, a primary storage system, and user devices (such as cellular phones, personal digital assistants (PDAs), handheld devices, laptop computers, personal computers, an Internet-of-Things (IoT) device, a smart phone, a machine type communication (MTC) device, a computing device, a drone, or any other portable or non-portable electronic device). In an example, the first host 402 of the present disclosure wishes to store a new data block in the storage 410 and the second host 404 enables in identification of whether new data block is already present in the storage 410. In an example, the third host 406, the fourth host 408 and so on, may also enable in identification of whether new data block is already present in the storage 410.

The computer system 400 provides the storage 410 holding encrypted data. The said storage 410 is accessible by the first host 402 and the second host 404. The term storage 410 as used herein refers to a volatile or persistent medium, such as an electrical circuit, magnetic disk, virtual memory or optical disk, in which a host can store data in form of encrypted data blocks for any duration. In other words, the storage 410 comprises one or more encrypted data blocks. In an example, the storage 410 is a centralized cloud storage.

According to an embodiment, the storage 410 is non-volatile mass storage such as physical storage media. Furthermore, a single storage may encompass and in a scenario wherein computing system is distributed, a processing, memory and/or storage capability may be distributed as well. The storage 410 may be a cloud storage comprising one or more encrypted data blocks. In an example, the cloud storage is configured to store an object. In an example, the cloud storage includes an object storage that depicts a new data block that the first host wants to store and an encrypted storage to store the blocks of data in an encrypted form. Beneficially, the cloud storage provides an improved storage for deduplication of data that is stored in the cloud storage that is common to the hosts.

The distributed ledger 412 is a database that is shared and synchronized by multiple parties (such as the first host 402, the second host 404 and the like) to store the one or more encrypted data blocks. In other words, the distributed ledger 412 is accessible to each of the two or more hosts (such as the first host 402, the second host 404) and holding, for each of the one or more encrypted data blocks, a first hash value identifying the data block. The distributed ledger 412 enables transactions (i.e. changes) in the data stored in the ledger 412 only by mutual consensus of all the parties preventing any changes being made by any unauthorized party or preventing any unauthorized changes made by any authorized party. All the information stored in the distributed ledger 412 is securely stored via cryptography such that information can be accessed only using authorized cryptographic keys available with authorized users only.

According to an embodiment, the ledger 412 is a blockchain. The blockchain is accessible to each of the first host 402, the second host 404, and the third host 406, the fourth host 408. The blockchain holds for each of the one or more encrypted data blocks, a hash value identifying the data block. According to an embodiment, the blockchain is a hyperledger.

In operation, the system 400 is configured to execute the following steps when the first host 402 of the two or more hosts attempts to store a new data block in the storage 410. The system 400 is configured to determine if the new data block is identical to a block already stored in the storage 410 by comparing a hash value calculated for the new data block to at least one hash value found in the distributed ledger 412. Further, if an identical hash value is found, the system 400 is configured to identify the second host 404 who stored the identical hash value and the data block that it identifies and presents, by the second host 404, a key allowing the first host 402 access to the already stored block for which the identical hash value was calculated. However, if an identical hash value is not found, the system 400 is configured to allow the first host 402 to store the encrypted new data block to the storage 410 and store the hash value calculated for the new data block in the ledger 412.

Figure 4B:
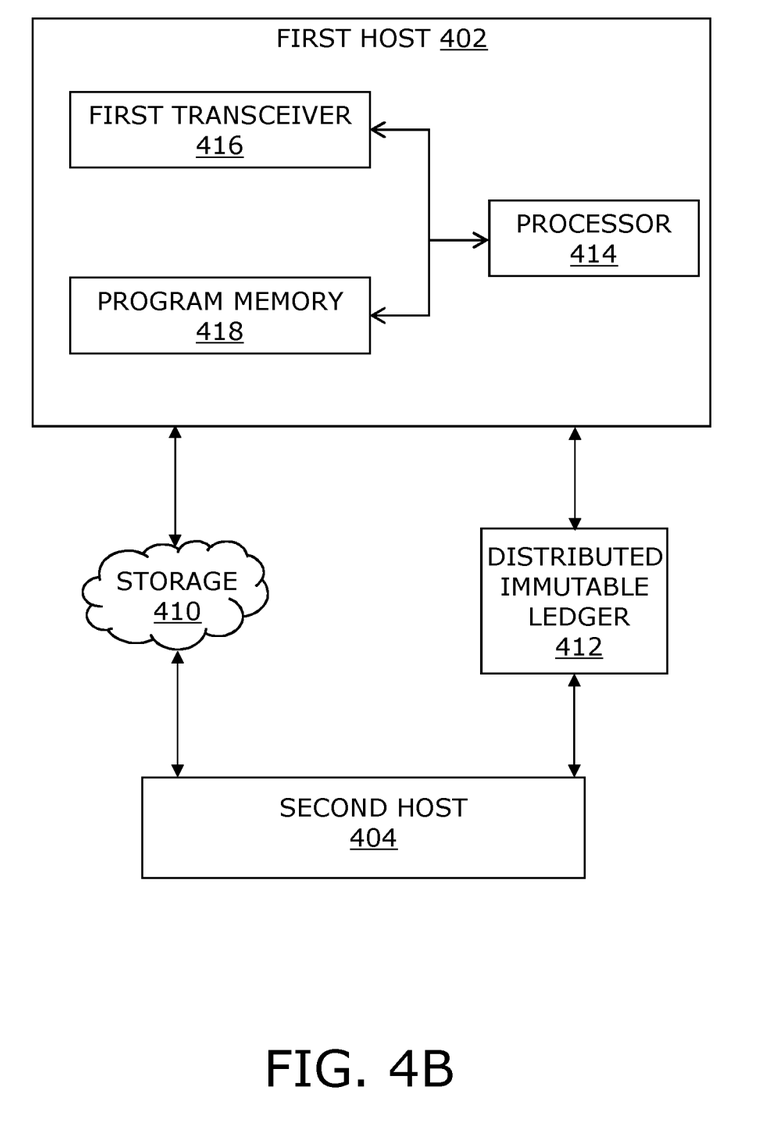
FIG. 4B is a block diagram that illustrates various exemplary components of a first host for use in a data network, in accordance with an embodiment of the present disclosure.

Referring now to FIG. 4B, illustrated is a block diagram that illustrates various exemplary components of a first host for use in a data network, in accordance with an embodiment of the present disclosure. FIG. 4B is described in conjunction with FIG. 4A. With reference to FIG. 4B, there is shown the first host 402. The first host 402 includes a processor 414, a first transceiver 416, and a program memory 418. The processor 414 may be communicatively coupled to the first transceiver 416 and the program memory 418. The first host 402 is connected to the second host 404 via the storage 410 and the distributed ledger 412.

There is shown, the first host 402 for use in a data network comprising a storage 410 holding encrypted data, said storage 410 being accessible by the host 402 and one or more other hosts, the first host 402 comprising a program memory 418 and a processor 414 for executing a program found in the program memory 418, wherein the program memory comprises a computer program product.

The processor 414 of the first host 402 is configured to provide data in form of data blocks for storage in the storage 410. In an implementation, the processor 414 is configured to execute instructions stored in the program memory 418. In an example, the processor 414 may be a general-purpose processor. Other examples of the processor 414 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the processor 414 may refer to one or more individual processors, processing devices, a processing unit that is part of a machine, such as the first host 402.

The first transceiver 416 includes suitable logic, circuitry, and interfaces that may be configured to communicate with one or more external devices, such as the storage 410 and the distributed ledger 412. Examples of the first transceiver 416 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card.

The program memory 418 refers to a primary storage system of the first host 402. The program memory 418 includes suitable logic, circuitry, and interfaces that may be configured to store instructions executable by the processor 414. Examples of implementation of the program memory 418 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory. The program memory 418 may store an operating system and/or other program products (including one or more operation algorithms) to operate the first host 402.

In one aspect, in operation, the processor 414 of the first host 402 wishes to store a new data block in the storage 410. The processor 414 is configured to obtain a first hash value for the new data block and further determine if the first hash value is found in the ledger 412. If the first hash value is not found in the ledger 412, the processor 414 is configured to create a set of confirmation data that constitute proof that the first host 402 has ownership of the data, encrypt the new data block with a block-unique encryption key and store the encrypted new data block in the storage 410 with a key that is equal to the first hash value, and store a first ownership record in the ledger 412. If the first hash value is found in the ledger 412, the first host 402 is configured to obtain from the ledger information about the second host 404 that has already stored a previous block identical to the new data block in the storage 410, enter in the ledger 412 a key request for the key to the previous block, receive from the ledger 412 a key transfer record stored by the second host 404, and send to the ledger 412 a new ownership record that the first host 402 has been given ownership of the data block.

According to an embodiment, the key request comprises the first hash value unencrypted and the set of confirmation data encrypted along with data about the requesting host (i.e. first host 402) with the public key of the second host 404. Based on the set of confirmation data encrypted with public key of the second host 404, the first host 402 checks that the set of confirmation data sent by the second host 404 is identical to the set of confirmation data calculated by the first host 402.

According to an embodiment, the key transfer record further comprises the hash value of the data and the identity of the first host 402. In other words, the key transfer record comprises hash value of the previous block and identity of the first host 402 with access to the previous block. The identity of the first host enables in assigning the ownership of previous block to the first host 402. The hash value of the data is stored in the ledger 412 to maintain a record that the second host 404 shared the requested key for the previous block with the first block.

According to an embodiment, the first and the new ownership record also comprises the private key encrypted with the public key of the first host 402. The private key is encrypted with the public key to protect the private key from access by any unauthorized users and to further prevent access of the set of confirmation data associated with the new data block of first host 402.

According to an embodiment, the set of confirmation data calculated by the second host 404 is stored in the ledger 412, encrypted by the private key of the second host 404. The set of confirmation data enables the second host 404 to prevent an access of the previous block stored in the ledger by any unauthorised user. The set of confirmation data is created to enable the second host 404 to have ownership of the previous block that is added to the ledger.

According to an embodiment, the set of confirmation data comprises a second hash value. The second hash value is created by applying the hashing algorithms. In an example, the second hash value in comparison to first hash value is not available for access by all hosts of the network. The second hash value provides enhanced security to the new data block of data.

Figure 4C:
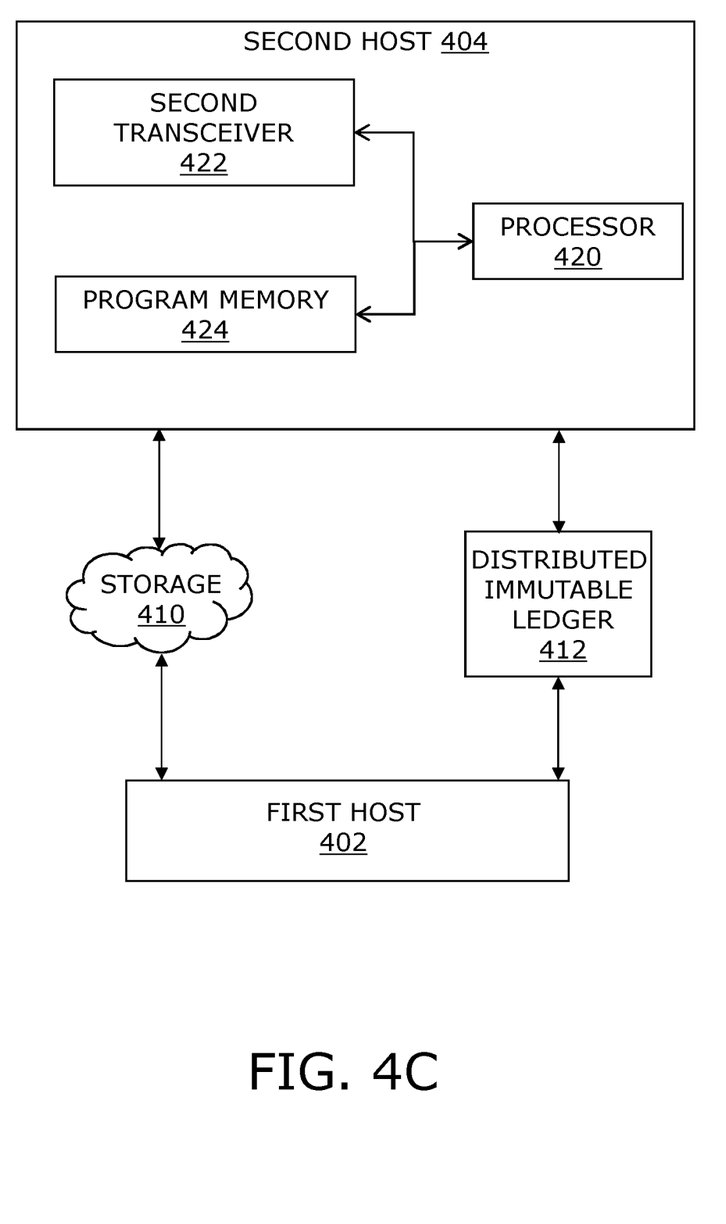
FIG. 4C is a block diagram that illustrates various exemplary components of a second host for use in a data network, in accordance with an embodiment of the present disclosure.

Referring now to FIG. 4C, illustrated is a block diagram that illustrates various exemplary components of a second host, in accordance with an embodiment of the present disclosure. FIG. 4C is described in conjunction with FIGS. 4A and 4B. With reference to FIG. 4C, there is shown the second host 404. The second host 404 includes a processor 420, a second transceiver 422, and a program memory 424. The processor 420 may be communicatively coupled to the second transceiver 422 and the program memory 424. The second host 404 is connected to the first host 402 via the storage 410 and the distributed ledger 412.

There is shown, a second host 404 for use in a data network comprising a storage holding encrypted data, said storage 410 being accessible by the host and one or more other hosts, the host comprising a program memory 424 and a processor 420 for executing a program found in the program memory 424, wherein the program memory 424 comprises a computer program product.

The processor 420 of the second host 404 is configured to execute instructions stored in the program memory 424 of the second host 404. Examples of the processor 420 of the second host 404 is similar to that of the processor 414 of the first host 402 (FIG. 4B). Similarly, examples of implementation of the second transceiver 422, and the program memory 424 is similar to that of the first transceiver 416, and the program memory 418, respectively of FIG. 4B.

In one aspect, in operation, the processor 420 of the second host 404 is configured to receive from the ledger 412, a key request stored in the ledger 412 by the first host 402 for the key to a previous block, based on a new data block that the first host 402 wishes to store. The second processor is further configured to evaluate the proof. Further, if the new and previous blocks are found to be identical, the second host 404 provides from the ledger 412 to the first host 402 a key transfer record.

According to an embodiment, the key request comprises a first hash value and a second hash value calculated by the first host 402 based on the new data block, the first hash value being unencrypted, and the second hash value being encrypted with the public key of the second host 404. The first hash value and the second hash value enable in providing proof that the new data block is identical to the previous block of data.

According to an embodiment, the step of evaluating the proof comprises comparing the second hash value to a second hash value calculated by the second host 404, and determining that the new and previous blocks are identical if the second hash values are identical. The second hash value of the new data block calculated by the first host 402 is compared with the second hash value of previous block calculated by the second host 404.

According to an embodiment, the key transfer record indicates the hash value of the data, the identity of the first host 402 and the key to the data encrypted with the public key of the first host 402, to give the first host 402 ownership to the previous block. In other words, the key transfer record includes the hash value of the previous block of data, an identification value of the first host 402 with access to the previous block, and the key used for encryption of the previous block.

According to an embodiment, second hash value calculated by the second host 404 is stored in the ledger 412, encrypted by a private key of the second host 404. The second hash value enables the second host 404 to prevent any unauthorized access of the previous block stored in the ledger 412.

Figure 5A:
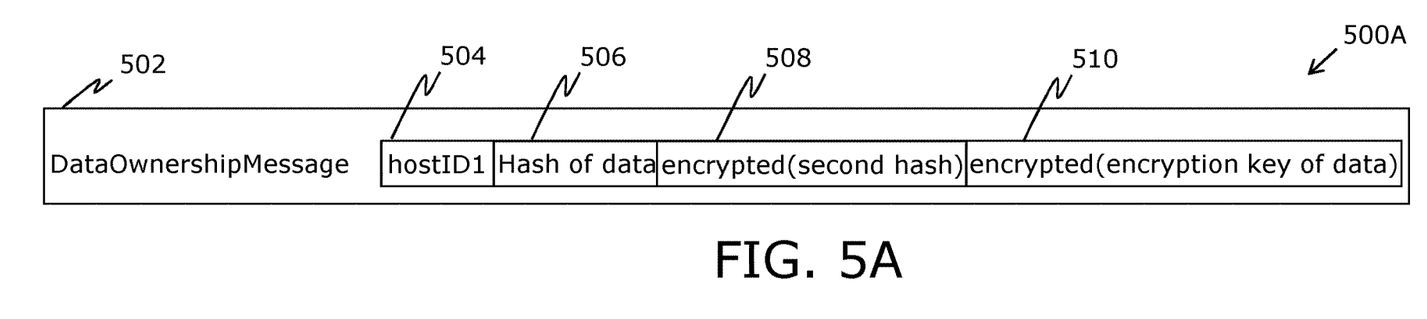
FIG. 5A is an illustration of exemplary messages used in a method of preventing duplication of encrypted data in the cloud storage, in accordance with an embodiment of the present disclosure.

Referring now to FIG. 5A, illustrated is an illustration of an exemplary message used in a method of preventing duplication of encrypted data in the cloud storage, in accordance with an embodiment of the present disclosure. With reference to FIG. 5A, there is shown the exemplary message 500A used in the method of preventing duplication of encrypted data in the cloud storage. The exemplary message 500A includes an ownership record 502.

The ownership record 502 comprises an identity of a first host 504, the first hash value unencrypted 506, the set of confirmation data 508 encrypted with a key known only to the first host and a key of an encryption of a data block 510 (i.e. a new data block of data) encrypted with a key known only to the first host. The ownership record 502 may also be referred to as data ownership message.

Figure 5B:
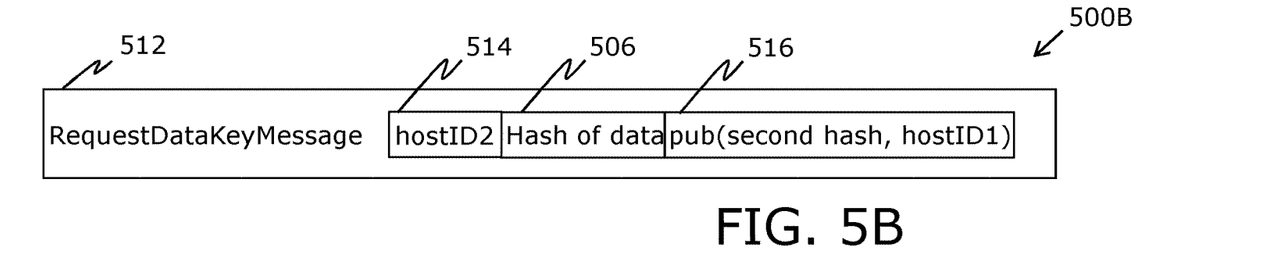
FIG. 5B is an illustration of exemplary messages used in a method of preventing duplication of encrypted data in the cloud storage, in accordance with another embodiment of the present disclosure.

FIG. 5B is an illustration of an exemplary message used in a method of preventing duplication of encrypted data in the cloud storage, in accordance with another embodiment of the present disclosure. With reference to FIG. 5B, there is shown the exemplary message 500B used in the method of preventing duplication of encrypted data in the cloud storage. The exemplary message 500B includes a key request 512.

A key request 512 comprises an identity of a second host 514, the first hash value unencrypted 506, and a set of confirmation data 516 encrypted with a public key of a second host. The key request 512 may also be referred to as the request data key message.

Figure 5C:
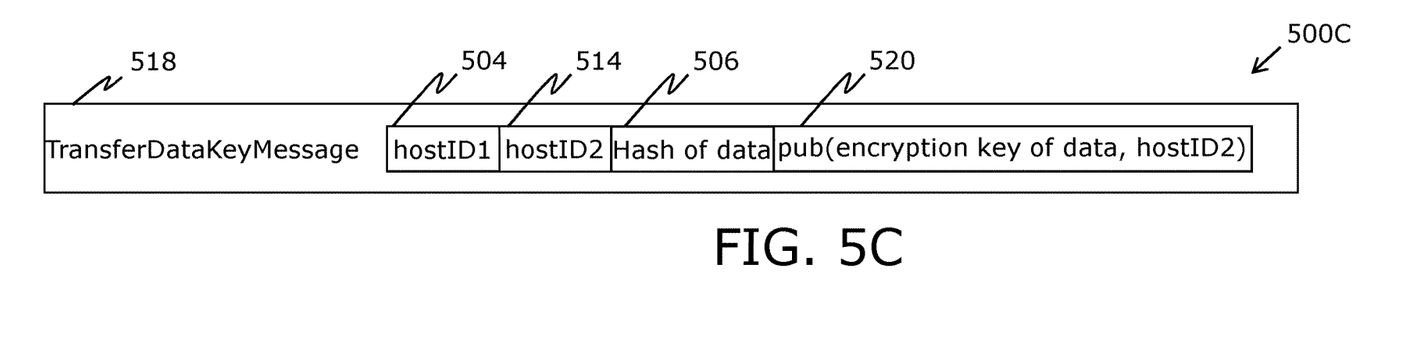
FIG. 5C is an illustration of exemplary messages used in a method of preventing duplication of encrypted data in the cloud storage, in accordance with yet another embodiment of the present disclosure.

FIG. 5C is an illustration of an exemplary message used in a method of preventing duplication of encrypted data in the cloud storage, in accordance with yet another embodiment of the present disclosure. With reference to FIG. 5C, there is shown the exemplary message 500C used in the method of preventing duplication of encrypted data in the cloud storage. The exemplary message 500C includes a key transfer record 518.

The key transfer record 518 comprises the identity of the first host 504, the identity of the second host 514, the first hash value unencrypted 506 and a key 520 of the data encrypted with the public key of the first host. The key transfer record 518 may also be referred to as transfer data key message.

According to an embodiment, the exemplary messages 502, 512 and 518 are mere examples and any protocol may be used which enable the second host to prove that the new data block is already present in the storage.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method of preventing duplication of encrypted data in a storage arranged in a network in which two or more hosts can store data in the network,
the storage comprising one or more encrypted data blocks, the network further comprising a distributed ledger, accessible to each of the two or more hosts and holding, for each of the one or more encrypted data blocks, a first hash value identifying the data block,
the method, performed by a first host of the two or more hosts, comprising:
obtaining a first hash value for the new data block;
determining if the first hash value is found in the ledger; when it is determined that the first hash value is not found in the ledger,
creating a set of confirmation data that constitute proof that the first host has ownership of the data;
encrypting the new data block with a block-unique encryption key and storing the encrypted new data block in the storage with a key that is equal to the first hash value; and
storing a first ownership record in the ledger, the first ownership record comprising the identity of the first host, the first hash value unencrypted, and the set of confirmation data encrypted with a key known only to the first host; and when it is determined that the first hash value is found in the ledger,
obtaining from the ledger information about a second host that has already stored a previous block identical to the new data block in the storage;
entering in the ledger a key request for the key to the previous block, the key request comprising the set of confirmation data, encrypted with the public key of the second host:
receiving from the ledger a key transfer record stored by the second host, the key transfer record comprising the key to the data encrypted with the public key of the first host; and
sending to the ledger a new ownership record that the first host has been given ownership of the data block.

2. The method according to claim 1, wherein the key request comprises the first hash value unencrypted and the set of confirmation data encrypted along with data about the requesting host with the public key of the second host.

3. The method according to claim 1 wherein the key transfer record further comprises the hash value of the data and the identity of the first host.

4. The method according to claim 1, wherein the first and the new ownership record also comprise the private key encrypted with the public key of the first host.

5. The method-according to claim 1, wherein the set of confirmation data calculated by the second host is stored in the ledger, encrypted by the private key of the second host.

6. The method according to claim 1, wherein the set of confirmation data comprises a second hash value.

7. A method of preventing duplication of data in a storage, arranged in a network in which two or more hosts can store data in the network,
the storage comprising one or more encrypted data blocks, the network further comprising a distributed ledger, accessible to each of the two or more hosts and holding, for each of the one or more encrypted data blocks, a hash identifying the data block,
the method, performed by a second host of the two or more hosts when a new data block is identical to a previous block of data stored in the storage by the second host, comprising:
receiving from the ledger a key request stored in the ledger by the first host for the key to the previous block, said key request comprising proof that the new data block is identical to the previous block of data;
evaluating the proof to determine whether the new and previous blocks are identical; and
when it is determined that the new and previous blocks are found to be identical, providing from the ledger to the first host a key transfer record including the key to the data encrypted with the public key of the first host.

8. The method according to claim 7, wherein the key request comprises a first hash value and a second hash value calculated by the first host based on the new data block, the first hash value being unencrypted, and the second hash value being encrypted with the public key of the second host.

9. The method according to claim 7, wherein the step of evaluating the proof comprises comparing the second hash value to a second hash value calculated by the second host, and determining that the new and previous blocks are identical when the second hash values are identical.

10. The method according to claim 7, wherein the key transfer record indicates the hash value of the data, the identity of the first host and the key to the data encrypted with the public key of the first host.

11. The method according to claim 7, wherein the second hash value calculated by the second host is stored in the ledger, encrypted by the private key of the second host.

12. A method of preventing duplication of encrypted data in a storage arranged in a network in which two or more hosts can store data in the network,
the storage comprising one or more encrypted data blocks, the network further comprising a distributed ledger, accessible to each of the two or more hosts and holding, for each of the one or more encrypted data blocks, a hash value identifying the data block,
the method comprising the following steps:
when a first host of the two or more hosts attempts to store a new data block in the storage,
determining whether the new data block is identical to a block already stored in the storage by comparing a hash value calculated for the new data block to at least one hash value found in the ledger;
when it is determined that an identical hash value is found, identifying a second host-which stored the identical hash value and the data block that it identifies; and
presenting, by the second host, a key allowing the first host access to the already stored block for which the identical hash value was calculated; and
when an identical hash value is not found, allowing the first host to store the encrypted new data block to the storage and storing the hash value calculated for the new data block in the ledger.

13. The method according to claim 12, comprising the step of obtaining the new data block by dividing a set of data into two or more blocks, of the same size or of variable size.

14. The method according to claim 12, wherein the ledger is a blockchain.

15. The method according to claim 12, wherein the blockchain is a hyperledger.

* * * * *

UNITED STATES PATENT AND TRADEMARK OFFICE
CERTIFICATE OF CORRECTION

PATENT NO. : 12,333,143 B2  
APPLICATION NO. : 18/171203  
DATED : June 17, 2025  
INVENTOR(S) : Assaf Natanzon Page 1 of 1

It is certified that error appears in the above-identified patent and that said Letters Patent is hereby corrected as shown below:

In the Claims

Claim 1: Column 22, Line 60: "the second host:" should read as -- the second host; --.

Claim 5: Column 23, Line 11: "The method-according to claim 1, wherein the set of" should read as -- The method according to claim 1, wherein the set of --.

Claim 11: Column 24, Line 11: "ledger, encrypted by the private key of the second host." should read as -- ledge, encrypted by the private key of the second host. --.

Claim 11: Column 24, Line 20: "the method comprising the following steps:" should read as -- the method comprising: --.

Signed and Sealed this  
Eighteenth Day of November, 2025

John A. Squires  
*Director of the United States Patent and Trademark Office*